US012748680B2

(12) United States Patent
Li et al.

(10) Patent No.: US 12,748,680 B2
(45) Date of Patent: Sep. 29, 2026

(54) METHOD FOR PROCESSING COMMAND, DEVICE FOR PROCESSING COMMAND, AND ELECTRONIC DEVICE

(71) Applicant: Lenovo (Beijing) Limited, Beijing (CN)

(72) Inventors: Yu Li, Beijing (CN); Guannan Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 457 days.

(21) Appl. No.: 18/345,806

(22) Filed: Jun. 30, 2023

(65) Prior Publication Data

US 2024/0004778 A1 Jan. 4, 2024

(30) Foreign Application Priority Data

Jul. 1, 2022 (CN) ......................... 202210766169.2

(51) Int. Cl.

*G06F 11/3604* (2025.01)
*G06F 8/41* (2018.01)
*G06F 9/455* (2018.01)
*G06F 16/901* (2019.01)

(52) U.S. Cl.

CPC .......... *G06F 11/3612* (2013.01); *G06F 8/427* (2013.01); *G06F 9/45512* (2013.01); *G06F 16/9024* (2019.01)

(58) Field of Classification Search

CPC .. G06F 11/3612; G06F 8/427; G06F 9/45512; G06F 16/9024
See application file for complete search history.

(56) References Cited

U.S. PATENT DOCUMENTS

| | | | | |
|---|---|---|---|---|
| 10,509,784 | B2 * | 12/2019 | James | G06F 16/2477 |
| 2007/0169008 | A1 * | 7/2007 | Varanasi | H04L 41/0226 717/136 |
| 2021/0026917 | A1 * | 1/2021 | Asturias | H04L 41/0266 |
| 2022/0253712 | A1 * | 8/2022 | Clement | G06N 3/04 |

* cited by examiner

*Primary Examiner* — Jay A Morrison

(74) *Attorney, Agent, or Firm* — ANOVA LAW GROUP, PLLC

(57) ABSTRACT

A method for processing command includes obtaining an input command-line interface (CLI) command, converting the CLI command into a tree structure to obtain a to-be-processed command tree, determining a target subtree corresponding to the to-be-processed command tree in a standard command tree, and parsing the to-be-processed command tree according to nodes and a connection structure between the nodes of the target subtree to obtain a command parsing result. The standard command tree is a command tree obtained by converting standard commands in a standard command set into an integrated tree structure.

20 Claims, 7 Drawing Sheets

Representation method of command a[b|c]e

METHOD FOR PROCESSING COMMAND, DEVICE FOR PROCESSING COMMAND, AND ELECTRONIC DEVICE

CROSS-REFERENCE TO RELATED APPLICATION

The present disclosure claims priority to Chinese Patent Application No. 202210766169.2, filed on Jul. 1, 2022, the entire content of which is incorporated herein by reference.

TECHNICAL FIELD

The present disclosure relates to the software engineering field and, more particularly, to a method for processing command, a device for processing command, and an electronic apparatus.

BACKGROUND

In the field of software engineering, production and management of a front-end project are efficiently and automatically performed by using a command-line interface (i.e., CLI) at the front end. However, as the complexity of the frontend project increases, the logic of a CLI command becomes more complex, which causes the command to be difficult to maintain and the execution of the command may be slow. Meanwhile, the internal logic of the CLI command is highly coupled and associated, which may cause the CLI command to report an abnormal error and to be terminated.

SUMMARY

Embodiments of the present disclosure provide a method for processing command. The method includes obtaining an input command-line interface (CLI) command, converting the CLI command into a tree structure to obtain a to-be-processed command tree, determining a target subtree corresponding to the to-be-processed command tree in a standard command tree, and parsing the to-be-processed command tree according to nodes and a connection structure between the nodes of the target subtree to obtain a command parsing result. The standard command tree is a command tree obtained by converting standard commands in a standard command set into an integrated tree structure.

Embodiments of the present disclosure provide a computer-readable storage medium storing a computer instruction set that, when executed by a processor, causes the processor to obtain an input command-line interface (CLI) command, convert the CLI command into a tree structure to obtain a to-be-processed command tree, determine a target subtree of the to-be-processed command tree corresponding to a standard command tree, and parse the to-be-processed command tree according to nodes and a connection structure of the nodes of the target subtree to obtain a command parsing result. The standard command tree is a command tree obtained by converting standard commands of a standard command set into an integrated tree structure.

Embodiments of the present disclosure provide an electronic apparatus including a memory and a processor. The memory stores a computer instruction set that, when executed by the processor, causes the processor to obtain an input command-line interface (CLI) command, convert the CLI command into a tree structure to obtain a to-be-processed command tree, determine a target subtree of the to-be-processed command tree corresponding to a standard command tree, and parse the to-be-processed command tree according to nodes and a connection structure of the nodes of the target subtree to obtain a command parsing result. The standard command tree is a command tree obtained by converting standard commands of a standard command set into an integrated tree structure.

DETAILED DESCRIPTION OF THE EMBODIMENTS

The technical solutions of embodiments of the present disclosure are described in detail below with reference to the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

The present disclosure provides a method for processing command, a device for processing command, and an electronic apparatus. A problem that a command-line interface (CLI) command is difficult to be maintained and performed under complex logic to cause slow performance or an abnormal error can be solved by performing a tree structure design on a string of the CLI command and based on command parsing of the tree structure. The method for processing command can be applied to but is not limited to an electronic apparatus under a general- or specific-purposed computing environment or configuration, such as a personal computer, a server computer, a handheld or portable apparatus, a tablet, a multiprocessor device, and etc.

Figure 1:
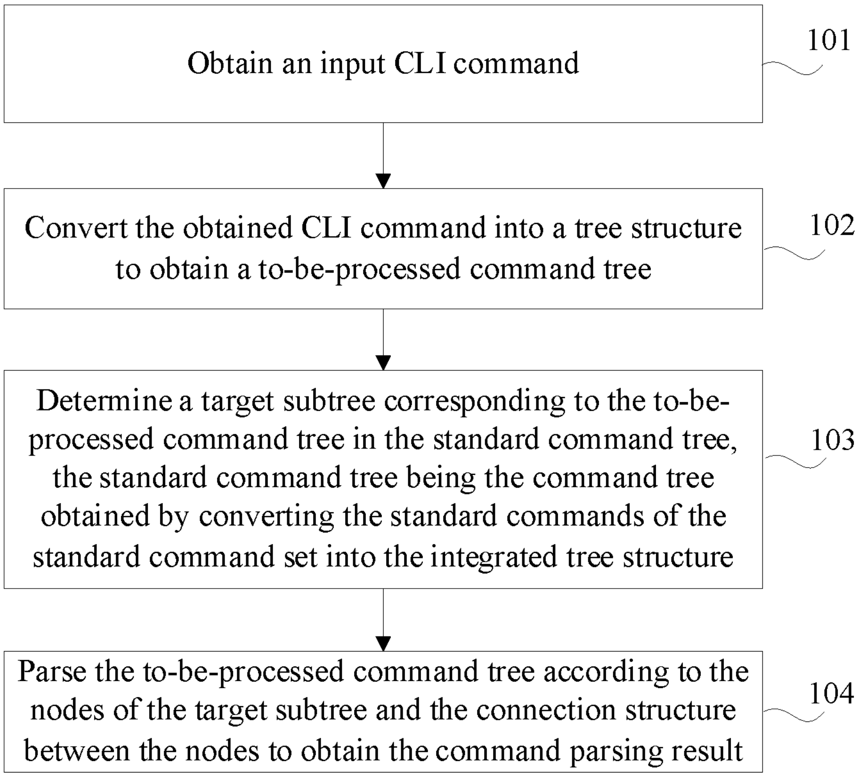
FIG. 1 illustrates a schematic flowchart of a method for processing command according to some embodiments of the present disclosure.

FIG. 1 illustrates a schematic flowchart of the method for processing command according to some embodiments of the present disclosure. The method of embodiments of the present disclosure includes the following processing steps.

At 101, an input CLI command is obtained.

The obtained CLI command can be but is not limited to a CLI command inputted by a user in constructing and managing a frontend project.

At 102, the obtained CLI command is converted into a tree structure to obtain a to-be-processed command tree.

In the present disclosure, the tree structure can be used as a core data structure when the command is parsed. Accordingly, after obtaining the input CLI command, the CLI command can be first converted into the tree structure. That is, the string of the original input command can be converted into the corresponding command tree. In embodiments of the present disclosure, the command tree obtained through the conversion can be referred to as the to-be-processed command tree.

The input CLI command can be parsed subsequently based on the to-be-processed command tree.

In some embodiments, a pre-established built-in standard command set can be used as a reference/matching basis for parsing the CLI command. The standard command set can include a series of standard commands that can be parsed, recognized, and performed by a machine.

For the tree structure design of the CLI command, standard commands of the standard command set can be pre-converted into an integrated tree structure. The tree structure can cover all the standard commands of the standard command set. In some embodiments, a command tree converted from the standard command set can be referred to as a standard command tree. The standard command tree can be divided into different subtrees based on different modes. A command of each mode can correspond to a specific command subtree or a collection of a plurality of specific command subtrees in the standard command tree. The mode can refer to a functional mode or an operational mode, such as installation, initialization, update, and exit for a system. Each mode can usually correspond to a CLI command. That is, each command can correspond to a functional mode/operational mode.

A node of the command tree can correspond to a command keyword in a command string of the CLI command/standard command, such as install, exit, and init. A connection relationship/structure between nodes can represent relationships between different command keywords, such as parallel, dependent, or a specific computation relationship. Accordingly, the internal logic of the input to-be-processed CLI command can be expressed through the nodes and the connection relationship/structure between the nodes included in the to-be-processed command tree. The internal logic of the corresponding standard command in the mode can be expressed through the nodes and the connection relationship/structure between the nodes included in the subtree/collection of the subtrees in the standard command tree corresponding to the mode.

Figure 2:
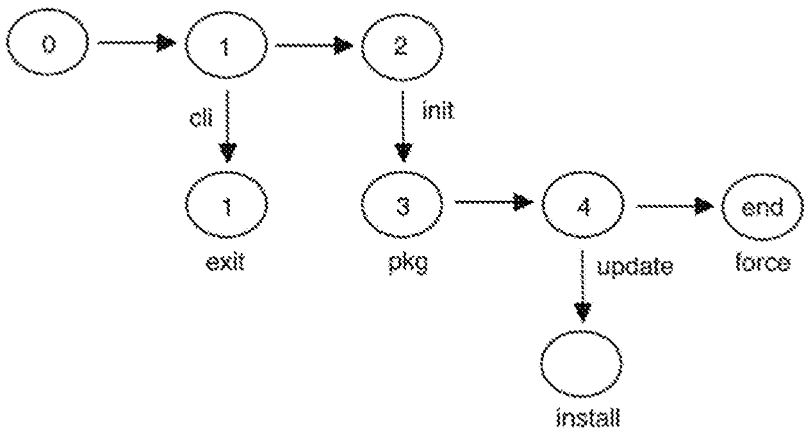
FIG. 2 illustrates a schematic diagram showing an exemplary tree structure of a standard command tree according to some embodiments of the present disclosure.

Assume that the standard command set includes four commands cli init, cli pkg install, cli pkg update force, and exit, an exemplary tree structure of the standard command tree corresponding to the standard command set is shown in FIG. 2. Each command can have an operation mode. The entire command tree is first divided into different subtrees based on different modes. Each subtree/a collection of the subtrees can correspond to a certain command. The command under each mode can be one or more collections of the command subtrees.

Figure 3A:
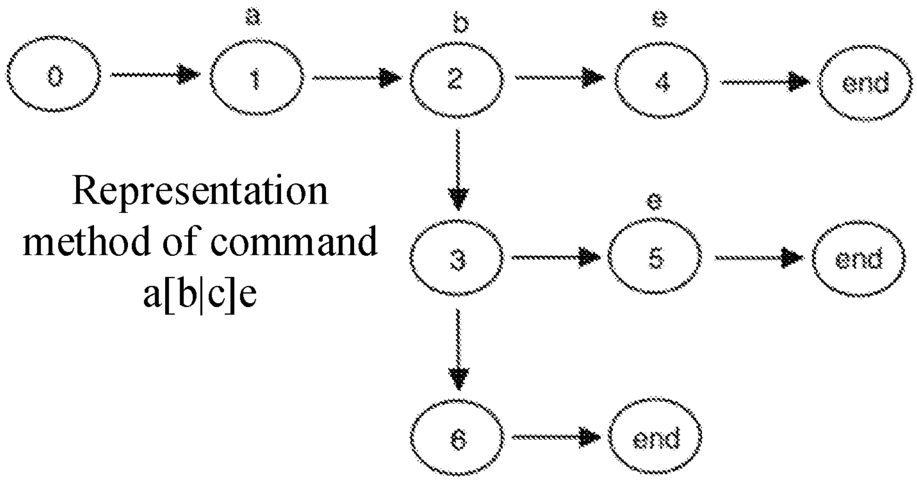
FIG. 3A and FIG. 3B illustrates schematic diagrams showing an expanded command tree structure and a compressed command tree structure of an interaction command according to some embodiments of the present disclosure.
Figure 3B:
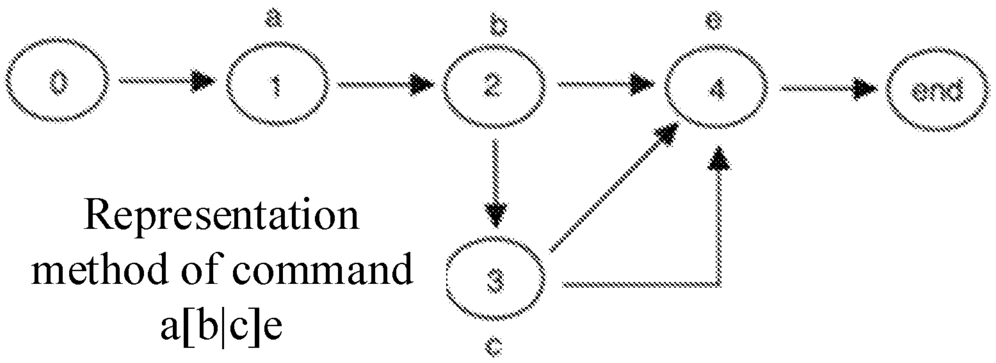

In the present disclosure, the command tree of the CLI command/standard command set is defined into two structural types, i.e., an expanded command tree structure and a compressed command tree structure. In the expanded command tree structure, duplicate tree nodes can be commonly found. Each node in the duplicate tree nodes can function within a respective subtree where the node is located. The compressed command tree structure can merge duplicate nodes to ensure that no duplicate nodes appear in the command tree to effectively improve storage performance. FIG. 3A and FIG. 3B illustrates schematic diagrams showing the expanded command tree structure and the compressed command tree structure of the CLI command according to some embodiments of the present disclosure.

In practical applications, for the above two tree structures, the standard command tree and the to-be-processed command tree can be constructed in the expanded command tree structure or the compressed command tree structure, which is not limited. The required type of the tree structure can be selected as needed.

For the input to-be-processed CLI command, when the input to-be-processed CLI command is converted into a tree structure to obtain a corresponding to-be-processed command, the command string corresponding to the CLI command can be constructed into an initial node. That is, the whole command string of the CLI command can be regarded as a node during initialization. Then, the initial node can be split. Thus, the command string of the initial node can be split into different command keywords, and different tree nodes corresponding to different command keywords can be formed accordingly. A connection structure can be formed between different tree nodes according to connection signs between different command keywords to obtain the tree structure of the to-be-processed command tree.

Figure 4:
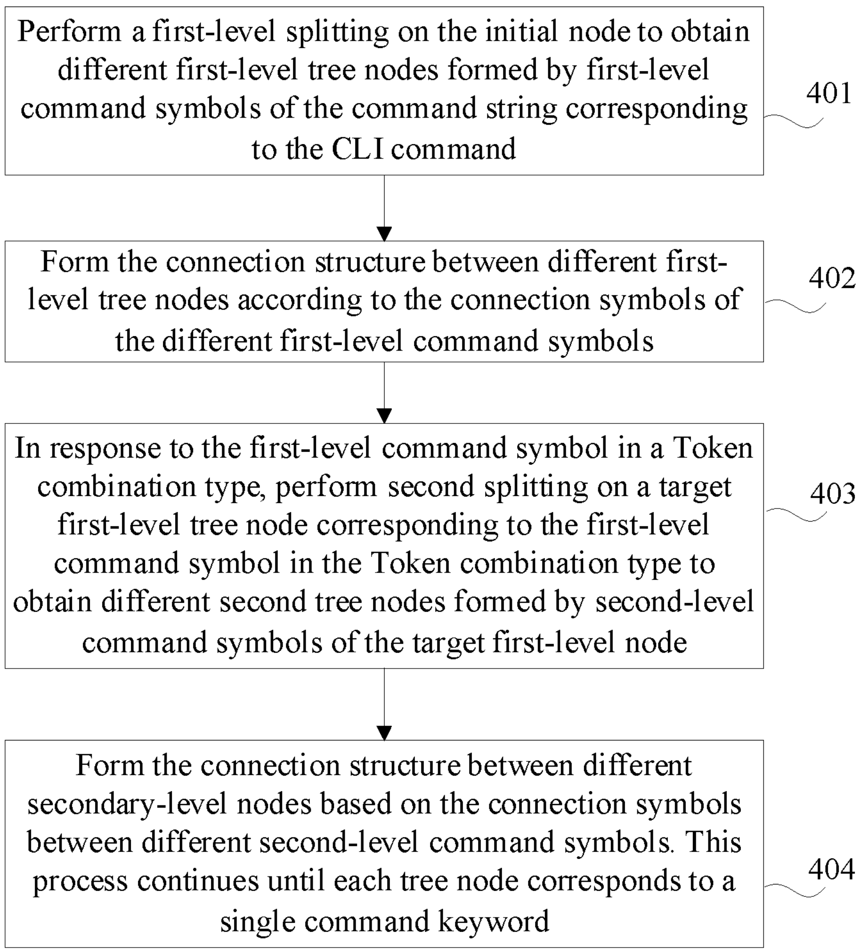
FIG. 4 illustrates a schematic diagram showing a construction process of a to-be-processed command tree according to some embodiments of the present disclosure.

FIG. 4 illustrates a schematic diagram showing a construction process of the to-be-processed command tree according to some embodiments of the present disclosure. Splitting the initial node to obtain the to-be-processed command tree further includes the following processes.

At 401, a first-level splitting is performed on the initial node to obtain different first-level tree nodes formed by first-level command symbols of the command string corresponding to the CLI command.

In a process of converting the CLI command into the tree structure, the entire command string of the CLI command can be initially regarded as a node. The process of constructing the to-be-processed command tree can be a process of continuously splitting the existing node in levels (first-level splitting, second-level splitting, . . . ) until each node of all nodes corresponds to a separate command keyword (Token) and can no longer be further split.

The command string of the CLI command can include but is not limited to the Token, parameters transmitted in, and connection signs representing the coupling/association relationship between different Tokens. The connection sign can include but is not limited to, a square bracket "[ ]," a curly bracket "{ }," or a logical operator such as "AND," "OR," "XOR," etc.

In the present disclosure, based on coupling strength degrees between different Tokens represented by the different connection signs of the command string, the existing node can be split. The command string can be progressively split in order according to the coupling degree from weak to strong (i.e., a priority of different connection signs from low to high).

For the initial node, when the initial node is split (i.e., first-level split), the whole command string can be divided into several substrings with the weakest coupling level therebetween according to the semantics of the connection signs of the overall command string. Each substring can be correspondingly treated as a node after splitting. Thus, each substring can also be treated as a first command symbol of the entire command string of the CLI command. The node corresponding to each substring can form one first-level tree node of the command tree.

For example, for a command symbol "[ ]" or "IL" assume that the priority of the command symbol is higher than other connection symbols (some connection symbols can be empty can be represented in abbreviated form) within a certain entire string where the command symbol is located. Thus, when the first-level splitting is performed on the initial node, characters enclosed in "[ ]" or "{ }" can be treated as a whole. Thus, the characters within "[ ]" or "{ }" cannot be further split. However, character portion outside "[ ]" or "{ }" can be split from the whole character portion corresponding to "[ ]" or "{ }".

Each substring obtained after the splitting can be a single Token or a combination of a plurality of Tokens connected in a whole by the connection symbols such as "[ ]" or "{ }."

At 402, the connection structure between different first-level tree nodes is formed according to the connection symbols of the different first-level command symbols.

Then, according to the connection symbols between the different first-level command symbols, the connection relationship/connection structure between the different first-level tree nodes can be constructed. Thus, the connection relationship/connection structure between the different first-level tree nodes can reflect the actual logical relationship between the first-level tree nodes. A connection relationship/connection structure between nodes can include an edge and related edge information (e.g., dependency relationship information, operational relationship information, etc.).

At 403, in response to the first-level command symbol in a Token combination type, a second splitting is performed on a target first-level tree node corresponding to the first-level command symbol in the Token combination type to obtain different second tree nodes formed by second-level command symbols of the target first-level node.

If a command symbol in the Token combination type exists in the first-level command symbols, a second-level splitting can be further performed on the target first-level tree node corresponding to the first command symbol in the Token combination type according to the coupling strength of the different Tokens in the Token combination to obtain the second-level command symbols of the target first-level tree node and generate a second-level tree node corresponding to each second-level command symbol.

At 404, the connection structure is formed between different second-level nodes based on the connection symbols between different second-level command symbols. This process continues until each tree node corresponds to a single command keyword, achieved by progressively splitting the tree nodes. Following a recursive approach, all tree nodes are split into single command keyword nodes. At this point, the resulting command tree represents the expanded tree structure of the input CLI command, forming the command tree for processing.

Meanwhile, according to the connection symbol between the different second-level command symbols, the connection relationship/connection structure between the different second-level tree nodes can be constructed until all the tree nodes are split into nodes with a single Token based on circular recursion thinking. Thus, the obtained command tree can be the to-be-processed command tree with the expanded tree structure corresponding to the input CLI command.

In some embodiments, if the compressed command tree is required for practical applications, the duplicate nodes in the obtained command tree can be further combined to obtain the required compressed command tree. If the internal logic of the CLI command is relatively simple, and no duplicate nodes exist in the command tree constructed based on the process shown in FIG. 4, the command tree can be used as an expanded command tree or a compressed command tree.

Figure 5:
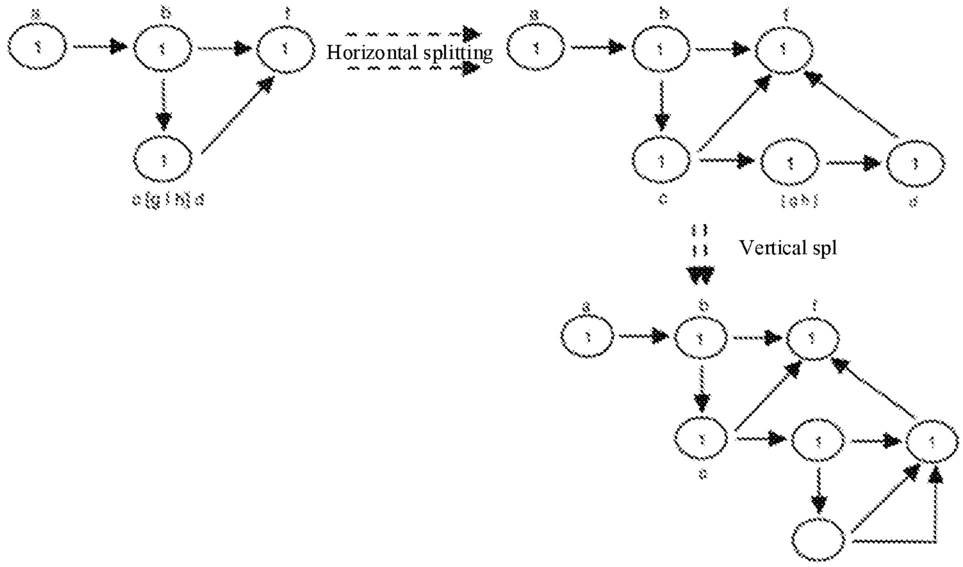
FIG. 5 illustrates a schematic diagram showing a part of a horizontal/vertical splitting process and a corresponding tree structure status according to some embodiments of the present disclosure.

Taking the command string "a[b|c[g|h]d]f" of the CLI command as an example, which can be provided as an example for constructing the command tree of the CLI command. First, the command string can be horizontally split (i.e., the nodes formed by performing the first-level splitting are expanded in a horizontal direction), substrings of "a," "[b|c[g|h]d]," and "f" can be obtained, and the corresponding nodes and matching connection structures can be formed. Then, vertical splitting can be performed on "[b|c[g|h]d]" (i.e., the nodes formed by performing the second-level splitting are expanded in a vertical direction) to obtain "b," "c[g|h]d," etc. Then, through a circular recursion process of horizontal/vertical splitting, the nodes formed in the combination Token type can be continuously split until each node of the nodes corresponds to a single Token. FIG. 5 illustrates a schematic diagram showing a part of a horizontal/vertical splitting process and a corresponding tree structure status according to some embodiments of the present disclosure.

Furthermore, the present disclosure can be a description file for constructing and associating a corresponding command with the standard command tree, which is a description file of the entire standard command tree corresponding to the internal standard set. The description file can include but is not limited to at least a part of the following information, such as a description of the structure of the standard command tree, the nodes included in the tree, semantics of the Tokens corresponding to the different nodes (i.e., semantics of the nodes), a flow sequence of the different nodes, a logic relationship, connection symbols connecting the different Tokens, semantic relationship/semantic structure represented by the connection symbols, a required to-be-performed action/event when implementing the command logic of the standard command represented by each subtree/the collection of the subtrees in the tree, and parameters required of the to-be-performed action/event.

For the input to-be-processed CLI command, when the input to-be-processed CLI command is converted into a tree structure, the priority of the different connection symbols or the represented coupling strength degree can be determined according to the description of the Tokens included in the command description file, the description of the connection symbols used to connect the different Tokens and the semantic relationship/semantic structure represented by the connection symbols, the Tokens and connection symbols of the command string for identifying the CLI command, and according to the description of the semantic relationship/semantic structure represented by the connection symbols. Thus, the command string can be split in levels to obtain the to-be-processed command tree corresponding to the CLI command.

If the compressed command tree is required in practical applications, different branches of the branches in the tree structure that have a same character prefix can be combined. Thus, the same character prefixes corresponding to the combined branches can share the same tree node to combine the duplicate nodes to obtain the to-be-processed tree structure with the compressed tree structure.

The character prefix corresponding to a branch of the tree structure can refer to the prefix of the string formed by the Tokens corresponding to the tree nodes included in the branch.

Figure 6A:
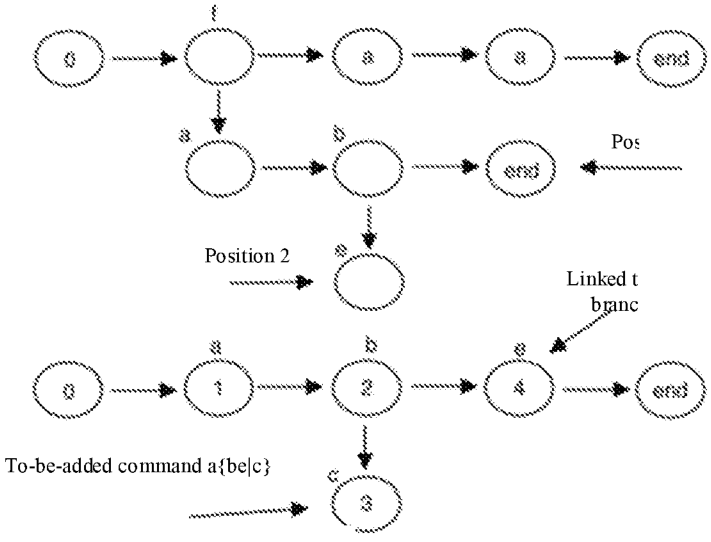
FIG. 6A and FIG. 6B illustrates schematic structural diagrams showing tree structures before and after combining and compressing different branches of a tree structure according to some embodiments of the present disclosure.
Figure 6B:
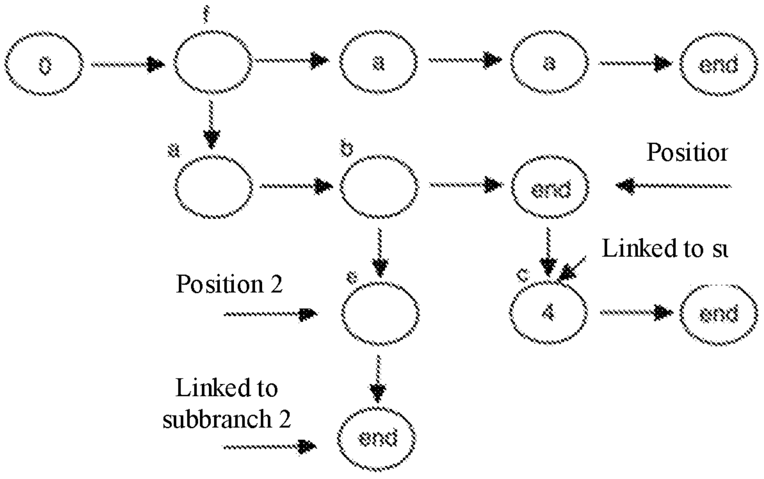

Further in connection with FIG. 6A and FIG. 6B, an example of compressing the tree structure is provided. As shown in FIG. 6A, branch 1 and branch 2 have the same character prefix. The parts with the same character prefix can be combined. A to-be-linked branch 1 and a to-be-linked branch 2 can be remaining different parts after maximally matching branch 1 and branch 2. The different parts can be linked to a position corresponding to branch 1. For example, the to-be-linked branch 1 and the to-be-linked branch 2 can be linked to position 1 and position 2 of branch 1. Thus, the duplicate nodes of branch 1 and branch 2 can be combined. FIG. 6B shows the structure after the combination. In FIG. 6A and FIG. 6B, nodes "0" and "end" represents start and end, respectively, and do not represent the actual Tokens, similarly for "0" and "end" appearing in other nodes in the figure.

The implementation process of performing the tree structure conversion on the input CLI command is described above. In the present disclosure, the process of converting the standard command into the integrated tree structure can be similar to the process of converting the input CLI command. The main difference can be that the standard command set has a larger tree structure.

At 103, a target subtree corresponding to the to-be-processed command tree is determined in the standard command tree. The standard command tree is the command tree obtained by converting the standard commands of the standard command set into the integrated tree structure.

After converting the input CLI command into the tree structure to obtain the corresponding to-be-processed command tree, subtree matching can be performed on the to-be-processed command tree in the standard command tree to obtain the target subtree corresponding to the to-be-processed command tree in the standard command tree.

At 104, the to-be-processed command tree is parsed according to the nodes of the target subtree and the connection structure between the nodes to obtain the command parsing result.

Figure 7:
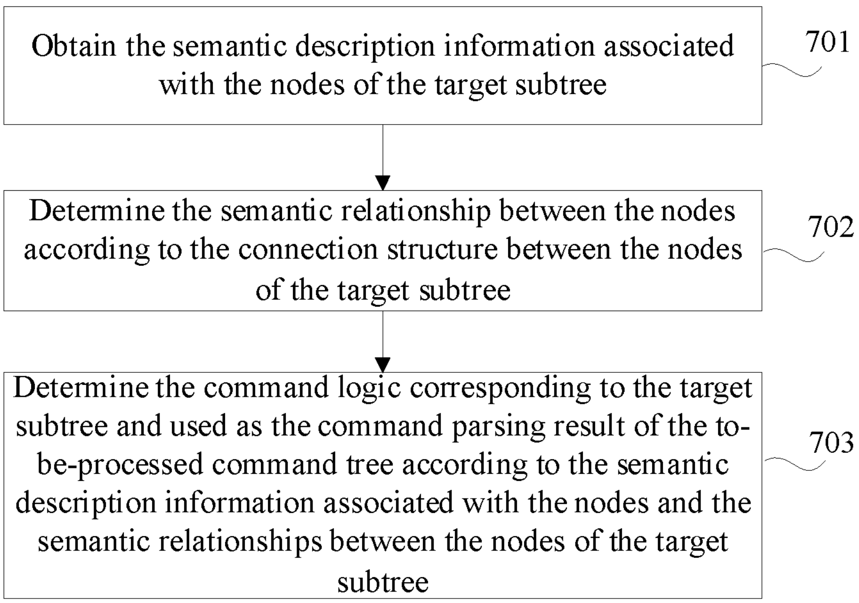
FIG. 7 illustrates a schematic diagram showing an implementation process of parsing a to-be-processed command tree according to some embodiments of the present disclosure.

Subsequently, the to-be-processed command tree can be parsed further according to the nodes of the target subtree and the connection structure between the nodes, i.e., parsing the input CLI command. As shown in FIG. 7, the process includes the following processes.

At 701, the semantic description information associated with the nodes of the target subtree is obtained.

At 702, the semantic relationship between the nodes is determined according to the connection structure between the nodes of the target subtree.

In some embodiments, the semantic description information associated with the nodes of the target subtree can be determined according to the command description file associated with the standard command tree and the semantic relationship/logical relationship between the nodes represented by the connection structure between the nodes of the target subtree.

At 703, the command logic corresponding to the target subtree is determined and used as the command parsing result of the to-be-processed command tree according to the semantic description information associated with the nodes and the semantic relationships between the nodes of the target subtree.

Subsequently, according to the semantic description information associated with the nodes and the semantic relationship/logical relationship between the nodes of the target subtree, the command logic corresponding to the target subtree (i.e., service logic indicated by the CLI command) can be analyzed to obtain the command parsing result of the to-be-processed command tree (the input CLI command).

Furthermore, according to the command description file associated with the standard command tree, the corresponding to-be-processed action/event (i.e., to-be-processed service action/event) can be determined for the parsed command logic. When relevant parameters are required for the to-be-processed action/event, the required parameters can be transmitted to the to-be-processed action/event to trigger the to-be-processed action/event based on this to perform the input CLI command.

The parameters required for the to-be-processed action/event can be identified and extracted from the command string according to the command description file associated with the standard command tree when the command string of the CLI command is parsed.

From the above solutions, the method of embodiments of the present disclosure can include pre-converting the standard commands in the standard command set into the integrated tree structure using the tree structure as the standard command tree for providing a reference basis, obtaining the input to-be-processed CLI command, converting the to-be-processed CLI command into the tree structure to obtain the to-be-processed command tree, performing matching on the to-be-processed command tree in the standard command tree to determine the target subtree corresponding to the to-be-processed command tree in the standard command tree, and parsing the to-be-processed command tree according to the nodes of the target subtree and the connection structure between the nodes.

In the present disclosure, the tree structure of the command tree can be used, which facilitates formation and representation of the internal logic of the CLI command simply, effectively, and clearly. Especially for the complex command string having a high coupling association between the internal logics, the complex association relationship can be described through the connection structure between the nodes of the command tree. Thus, a parsing error can be difficult to appear, and the problem that the CLI command is difficult to be maintained and performed to cause the slow performance or the abnormal error under the complex logic can be effectively solved.

In addition, with the increasing complexity of services, the format and type of the CLI command can have needs for customization. The existing CLI command using the string structure and the parsing manner cannot well support the needs. In the present disclosure, based on the tree type data structure of the command tree provided for the CLI command, as long as the corresponding matching function is pre-customized, customization of the CLI command with any data type and any format can be well supported. The matching function can refer to a matching rule between the customized service logic/the service action or event that needs to be performed corresponding to service logic and the command format/type.

Figure 8:
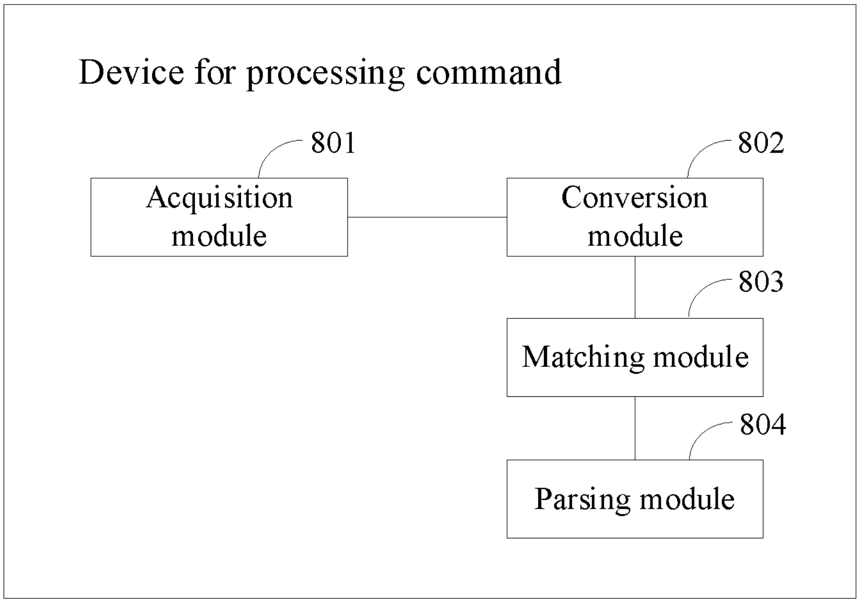
FIG. 8 illustrates a schematic structural diagram of a command processing device according to some embodiments of the present disclosure.

Corresponding to the above method for processing command, embodiments of the present disclosure also provide a command processing device. FIG. 8 illustrates a schematic structural diagram of the command processing device according to some embodiments of the present disclosure. The device includes an acquisition module 801, a conversion module 802, a matching module 803, and a parsing module 804.

The acquisition module 801 can be configured to obtain the input CLI command.

The conversion module 802 can be configured to convert the CLI command into a tree structure to obtain the to-be-processed command tree.

The matching module 803 can be configured to determine the target subtree corresponding to the to-be-processed command tree in the standard command tree. The standard command tree can be the command tree obtained by converting the standard commands of the standard command set into the integrated tree structure.

The parsing module 804 can be configured to parse the to-be-processed command tree according to the nodes and connection structure between the nodes of the target subtree to obtain the command parsing result.

In one embodiment, the conversion module 802 can be configured to construct the command string corresponding to the CLI command into the initial node and perform the splitting process on the initial node to split the command string of the initial node into different Tokens to form different tree nodes corresponding to different Tokens and form the connection structure between different tree nodes according to the connection symbols between different Tokens to obtain the tree structure of the to-be-processed command tree.

In some embodiments, when performing the splitting process on the initial node to split the command string of the initial node into different Tokens to form different tree nodes corresponding to different Tokens and form the connection structure between different tree nodes according to the connection symbols between different Tokens, the conversion module 802 can be configured to:

- perform the first-level splitting on the initial node to obtain different first-level tree nodes formed by the first-level command symbols of the command string;
- form the connection structure between different first-level tree nodes according to the connection symbols between different first-level command symbols;
- in response to the first-level command symbol in Token combination type, perform the second-level splitting on the target first-level tree node corresponding to the first command symbol in the Token combination type to obtain different second-level tree nodes formed by the second-level command symbols of the target first tree node; and
- form the connection structure between different second-level tree nodes according to the connection symbols between different second-level command symbols until the command symbol corresponding to each tree node is a single Token by splitting the tree nodes in levels.

In some embodiments, the tree nodes can be split according to the command description file. The command description file can include the description of the Token and the description of the semantic relationship or semantic structure represented by the connection symbol for connecting different Tokens.

In some embodiments, if the to-be-processed command tree is an expanded command tree, the conversion module 802 can obtain the to-be-processed command tree when causing the command symbol corresponding to each tree node to be the single Token by splitting the tree nodes in levels.

If the to-be-processed command tree is a compressed command tree, the conversion module 802 can combine the tree structure to obtain the to-be-processed command tree when causing the command symbol corresponding to each tree node to be a single Token by splitting the tree node in levels.

In some embodiments, when performing the combination process on the tree structure, the conversion module 802 can be configured to:

- combine different branches of the branches of the tree structure corresponding to the same character prefix to cause the combined different branches corresponding to the same character prefix to share the same tree node.

The character prefix corresponding to the branch of the tree structure can be the prefix of the string formed by the Tokens corresponding to the nodes included in the branch.

In some embodiments, the matching module 803 can be configured to perform subtree matching on the to-be-processed command tree on the standard command tree to obtain the target subtree corresponding to the to-be-processed command tree on the standard command tree.

In some embodiments, the nodes on the standard command tree are associated with corresponding semantic description information. The parsing module 804 can be configured to:

- obtain the semantic description information associated with the nodes of the target subtree;
- determine the semantic relationship between the nodes according to the connection structure between the nodes of the target subtree; and
- determine the command logic corresponding to the target subtree according to the semantic description information associated with the nodes of the target subtree and the semantic relationship between the nodes and use the command logic as the command parsing result of the to-be-processed command tree.

Since the command processing device of the present disclosure corresponds to the method for processing command of method embodiments of the present disclosure, the description of the command processing device can be simple. For the related part, reference can be made to method embodiments, which are not repeated here.

Embodiments of the present disclosure also provide an electronic apparatus. The electronic apparatus can be but is not limited to, an apparatus of general or special-purpose calculation device environment or configuration. For example, the electronic apparatus can include a personal computer, a server computer, a handheld apparatus or portable apparatus, a tablet, a multiprocessor device, etc.

Figure 9:
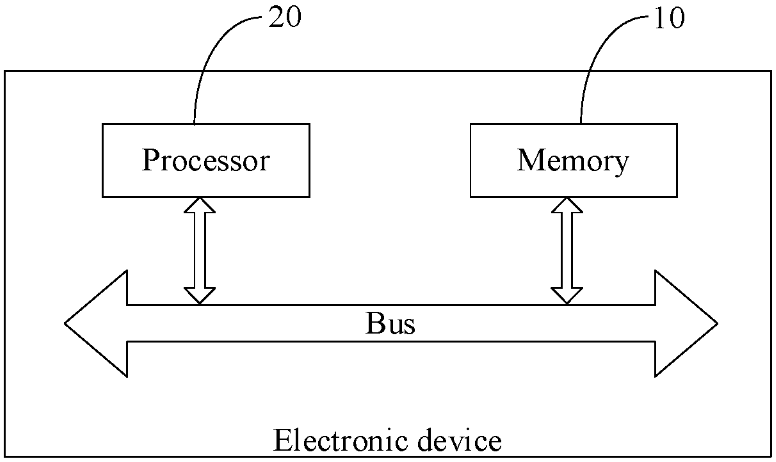
FIG. 9 illustrates a schematic structural diagram of an electronic apparatus according to some embodiments of the present disclosure.

A structural of the electronic apparatus is shown in FIG. 9 and includes a memory 10 and a processor 20.

The memory 10 can be used to store a computer instruction set.

The computer instruction set in the memory 10 can be implemented as a computer program.

The processor 20 can be configured to execute the computer instruction set to implement the method for processing command of method embodiments of the present disclosure.

The processor 20 can be a central processing unit (CPU), an application-specific integrated circuit (ASIC), a digital signal processor (DSP), a dedicated integrated circuit (ASIC), a field-programmable gate array (FPGA), or another programmable logic device.

In addition, the electronic apparatus can also include components such as a communication interface and a communication bus. The memory, the processor, and the communication interface can communicate with each other through the communication bus.

The communication interface can be configured for communication between the electronic apparatus and another apparatus. The communication bus can be a Peripheral Component Interconnect (PCI) bus or an Extended Industry Standard Architecture (EISA) bus, etc. The communication bus can be classified as an address bus, a data bus, a control bus, etc.

Embodiments of the present disclosure are described in a progressive manner. Each embodiment focuses on the differences from other embodiments. The common and similar parts among embodiments can be referred to each other.

To facilitate the description, the above system or device is described in various modules or units based on the functions. In the present disclosure, the functions of the units can be implemented in a same or a plurality of pieces of software and/or hardware.

According to the description of embodiments of the present disclosure, those skilled in the art can clearly understand that the present disclosure can be implemented by software and a necessary general hardware platform. Based on this understanding, the essence of the technical solution of the present disclosure or the part of the technical solution of the present disclosure contributing to the existing technology can be embodied in a form of a software product. The computer software product can be stored in a storage medium such as ROM/RAM, disk, CD, etc., including a plurality of instructions used to cause a computer apparatus (e.g., a personal computer, a server, or a network apparatus) to execute the method of embodiments or certain parts of embodiments of the present disclosure.

In the specification, terms such as first, second, third, and fourth are merely used to distinguish one entity or operation from another entity or operation and do not necessarily imply any actual relationship or order between these entities or operations. Moreover, the terms "including," "comprising," or any other variations thereof are intended to encompass non-exclusive inclusion. Thus, a process, a method, an article, or an apparatus comprising a series of elements includes not only those elements but also other elements that are not explicitly listed but are inherent to the process, method, article, or apparatus. Unless otherwise specified, the phrase "including a . . . " does not exclude the existence of additional identical elements in the process, method, article, or apparatus comprising the elements.

Some embodiments of the present disclosure are described above. Those skilled in the art can make various modifications and improvements without departing from the principles of the present disclosure. These modifications and improvements are within the scope of the present disclosure.

What is claimed is:

1. A method for processing command, comprising:

obtaining an input command-line interface (CLI) command;

converting the CLI command into a tree structure to obtain a to-be-processed command tree, the converting the CLI command into the tree structure comprises splitting a command string of the CLI command in levels according to coupling strength degrees between Tokens represented by connection symbols from weak to strong, the coupling strength degrees corresponding to the levels increase with increasing levels such that each higher level corresponds to a stronger coupling strength degree than each lower splitting level;

determining a target subtree corresponding to the to-be-processed command tree in a standard command tree, the standard command tree being a command tree obtained by converting standard commands in a standard command set into an integrated tree structure;

parsing the to-be-processed command tree according to nodes and a connection structure between the nodes of the target subtree to obtain a command parsing result including a command logic corresponding to the target subtree, wherein each node of the to-be-processed command tree corresponds to a command keyword of the CLI command, and the connection structure between the nodes represents semantic relationships between command keywords, thereby reducing parsing errors and avoiding performance degradation and abnormal errors caused by complex coupling associations between the command keywords of the CLI command;

determining, based on the command parsing result, a to-be-performed action corresponding to the command logic; and triggering the to-be-performed action to execute the input CLI command.

2. The method according to claim 1, wherein converting the CLI command into the tree structure includes:

constructing the command string corresponding to the CLI command as an initial node;

performing a splitting process on the initial node to split the command string in the initial node into different Tokens, forming different tree nodes corresponding to the different Tokens, forming a connection structure between different tree nodes according to connection symbols of the different Tokens, and obtaining a tree structure of the to-be-processed command tree.

3. The method according to claim 2, wherein performing the splitting process on the initial node to split the command string in the initial node into different Tokens, forming different tree nodes corresponding to the different Tokens, and forming the connection structure between different tree nodes according to the connection symbols of the different Tokens includes:

performing first-level splitting on the initial node to obtain different first-level tree nodes formed by first-level command symbols of the command string;

forming a connection structure between different first-level tree nodes according to connection symbols between different first-level command symbols;

in response to a first-level command symbol in a Token combination type, performing second-level splitting on a target first-level tree node corresponding to the first-level command symbol in the Token combination type, and obtaining different second-level tree nodes formed by second-level command symbols of the target first-level tree node; and forming a connection structure between the different second-level tree nodes according to connection symbols of different second-level command symbols until a command symbol corresponding to each tree node is a single Token by splitting the tree nodes in levels.

4. The method according to claim 3, wherein:

the tree nodes are split according to a command description file; and the command description file includes a Token description and a description of a semantic relationship or a semantic structure represented by a connection symbol that is used to connect the different Tokens.

5. The method according to claim 3, further comprising:

in response to the to-be-processed command tree being an expanded command tree, obtaining the to-be-processed command tree when splitting the tree node in levels to cause a command symbol corresponding to each tree node to be a single Token; and in response to the to-be-processed command tree being a compressed command tree, obtaining the to-be-processed command tree and combining the tree structure when splitting the tree node in levels to cause the command symbol corresponding to each tree node to be the single Token.

6. The method according to claim 5, wherein combining the tree structure includes:

combining different branches of branches of the tree structure corresponding to a same character prefix to cause the combined different branches corresponding to the same character prefix to share a same tree node, a character prefix corresponding to a branch of the tree structure includes a prefix of a string formed by Tokens corresponding to tree nodes included in the branch.

7. The method according to claim 1, wherein determining the target subtree corresponding to the to-be-processed command tree in the standard command tree includes:

performing subtree matching on the to-be-processed command tree in the standard command tree to obtain the target subtree corresponding to the to-be-processed command tree in the standard command tree.

8. The method according to claim 1, wherein:

nodes of the standard command tree are associated with corresponding semantic description information; and parsing the to-be-processed command tree according to the nodes and connection structure of the nodes of the target subtree includes:

obtaining semantic description information associated with nodes of the target subtree;

determining the semantic relationship between the nodes according to the connection structure between the nodes of the target subtree; and determining the command logic corresponding to the target subtree according to the semantic description information associated with the nodes and the semantic relationship between the nodes of the target subtree and using the command logic as the command parsing result of the to-be-processed command tree.

9. A non-transitory computer-readable storage medium storing a computer instruction set that, when executed by a processor, causes the processor to:

obtain an input command-line interface (CLI) command;

convert the CLI command into a tree structure to obtain a to-be-processed command tree, the converting the CLI command into the tree structure comprises splitting a command string of the CLI command in levels according to coupling strength degrees between Tokens represented by connection symbols from weak to strong, the coupling strength degrees corresponding to the levels increase with increasing levels such that each higher level corresponds to a stronger coupling strength degree than each lower splitting level;

determine a target subtree of the to-be-processed command tree corresponding to a standard command tree, the standard command tree being a command tree obtained by converting standard commands of a standard command set into an integrated tree structure;

parse the to-be-processed command tree according to nodes and a connection structure of the nodes of the target subtree to obtain a command parsing result including a command logic corresponding to the target subtree, wherein each node of the to-be-processed command tree corresponds to a command keyword of the CLI command, and the connection structure between the nodes represents semantic relationships between command keywords, thereby reducing parsing errors and avoiding performance degradation and abnormal errors caused by complex coupling associations between the command keywords of the CLI command;

determine, based on the command parsing result, a to-be-performed action corresponding to the command logic; and trigger the to-be-performed action to execute the input CLI command.

10. The non-transitory computer-readable storage medium according to claim 9, wherein the processor is further configured to:

construct the command string corresponding to the CLI command as an initial node;

perform a splitting process on the initial node to split the command string in the initial node into different Tokens, form different tree nodes corresponding to the different Tokens, form a connection structure between different tree nodes according to connection symbols of the different Tokens, and obtain a tree structure of the to-be-processed command tree.

11. The non-transitory computer-readable storage medium according to claim 10, wherein the processor is further configured to:

perform first-level splitting on the initial node to obtain different first-level tree nodes formed by first-level command symbols of the command string;

form a connection structure between different first-level tree nodes according to connection symbols between different first-level command symbols;

in response to a first-level command symbol in a Token combination type, perform second-level splitting on a target first-level tree node corresponding to the first-level command symbol in the Token combination type, and obtain different second-level tree nodes formed by second-level command symbols of the target first-level tree node; and form a connection structure between the different second-level tree nodes according to connection symbols of different second-level command symbols until a command symbol corresponding to each tree node is a single Token by splitting the tree nodes in levels.

12. The non-transitory computer-readable storage medium according to claim 11, wherein:

the tree nodes are split according to a command description file; and the command description file includes a Token description and a description of a semantic relationship or a semantic structure represented by a connection symbol that is used to connect the different Tokens.

13. An electronic device comprising:

a processor; and a memory storing a computer instruction set that, when executed by the processor, causes the processor to:

obtain an input command-line interface (CLI) command;

convert the CLI command into a tree structure to obtain a to-be-processed command tree, the converting the CLI command into the tree structure comprises splitting a command string of the CLI command in levels according to coupling strength degrees between Tokens represented by connection symbols from weak to strong, the coupling strength degrees corresponding to the levels increase with increasing levels such that each higher level corresponds to a stronger coupling strength degree than each lower splitting level;

determine a target subtree of the to-be-processed command tree corresponding to a standard command tree, the standard command tree being a command tree obtained by converting standard commands of a standard command set into an integrated tree structure;

parse the to-be-processed command tree according to nodes and a connection structure of the nodes of the target subtree to obtain a command parsing result including a command logic corresponding to the target subtree, wherein each node of the to-be-processed command tree corresponds to a command keyword of the CLI command, and the connection structure between the nodes represents semantic relationships between command keywords, thereby reducing parsing errors and avoiding performance degradation and abnormal errors caused by complex coupling associations between the command keywords of the CLI command;

determine, based on the command parsing result, a to-be-performed action corresponding to the command logic; and trigger the to-be-performed action to execute the input CLI command.

14. The device according to claim 13, wherein the processor is further configured to:

construct the command string corresponding to the CLI command as an initial node;

perform a splitting process on the initial node to split the command string in the initial node into different Tokens, form different tree nodes corresponding to the different Tokens, form a connection structure between different tree nodes according to connection symbols of the different Tokens, and obtain a tree structure of the to-be-processed command tree.

15. The device according to claim 14, wherein the processor is further configured to:

perform first-level splitting on the initial node to obtain different first-level tree nodes formed by first-level command symbols of the command string;

form a connection structure between different first-level tree nodes according to connection symbols between different first-level command symbols;

in response to a first-level command symbol in a Token combination type, perform second-level splitting on a target first-level tree node corresponding to the first-level command symbol in the Token combination type, and obtain different second-level tree nodes formed by second-level command symbols of the target first-level tree node; and form a connection structure between the different second-level tree nodes according to connection symbols of different second-level command symbols until a command symbol corresponding to each tree node is a single Token by splitting the tree nodes in levels.

16. The device according to claim 15, wherein:

the tree nodes are split according to a command description file; and the command description file includes a Token description and a description of a semantic relationship or a semantic structure represented by a connection symbol that is used to connect the different Tokens.

17. The device according to claim 15, the processor is further configured to:

in response to the to-be-processed command tree being an expanded command tree, obtain the to-be-processed command tree when splitting the tree node in levels to cause a command symbol corresponding to each tree node to be a single Token; and in response to the to-be-processed command tree being a compressed command tree, obtain the to-be-processed command tree and combine the tree structure when splitting the tree node in levels to cause the command symbol corresponding to each tree node to be the single Token.

18. The device according to claim 17, wherein the processor is configured to:

combine different branches of branches of the tree structure corresponding to a same character prefix to cause the combined different branches corresponding to the same character prefix to share a same tree node, a character prefix corresponding to a branch of the tree structure includes a prefix of a string formed by Tokens corresponding to tree nodes included in the branch.

19. The device according to claim 13, wherein the processor is further configured to:

perform subtree matching on the to-be-processed command tree in the standard command tree to obtain the target subtree corresponding to the to-be-processed command tree in the standard command tree.

20. The device according to claim 13, wherein:

nodes of the standard command tree are associated with corresponding semantic description information; and the processor is further configured to:

obtain semantic description information associated with nodes of the target subtree;

determine the semantic relationship between the nodes according to the connection structure between the nodes of the target subtree; and determine the command logic corresponding to the target subtree according to the semantic description information associated with the nodes and the semantic relationship between the nodes of the target subtree and using the command logic as the command parsing result of the to-be-processed command tree.

* * * * *